United States Patent Office 2,867,626
Patented Jan. 6, 1959

2,867,626
SYNTHESIS OF PORPHYRIN VANADIUM COMPLEXES

John Gordon Erdman, Allison Park, Pa., assignor to Gulf Research & Development Company, Pittsburgh, Pa., a corporation of Delaware No Drawing. Application May 18, 1956
Serial No. 585,604

16 Claims. (Cl. 260—314)

This invention relates to a process for the synthesis of porphyrin vanadium complexes.

The synthesis of several porphyrin vanadium complexes has heretofore been described by A. Treibs in Annalen der Chemie 517, 192–3 (1935). His procedure for preparing porphyrin vanadium complexes consisted in dissolving a porphyrin in acetic acid, adding vanadium tetrachloride ($VCl_4$), an excess of sodium acetate, and heating the mixture in a silver pressure vessel at 165° C. for four hours. He succeeded in synthesizing vanadium complexes of mesoporphyrin, mesoporphyrin dimethyl ester and etioporphyrin.

The method described by Treibs for synthesizing porphyrin vanadium complexes is objectionable because of the need for elevated temperatures and pressures. At such conditions of reaction several porphyrins, e. g., protoporphyrin IX, and the like, tend to be destroyed or altered in molecular structure. Thus, protoporphyrin IX tends to polymerize through the two vinyl groups present in the molecule, thereby yielding an undesired reaction product. A further objection to his procedure is the need for the volatile unstable liquid vanadium tetrachloride, which fumes badly in air and tends to decompose slowly even in a sealed container. As a consequence special precautions are required for handling this reagent.

I have now discovered that by reacting a porphyrin with a vanadyl salt in a mutual solvent, substantially quantitative yields of porphyrin vanadium complexes can be prepared at low reaction temperatures and ordinary atmospheric pressures. The mutual solvent employed need not dissolve all of the reactants used.

As indicated in the foregoing brief description of my invention, the instant process is applicable to the synthesis of porphyrin vanadium complexes and can be applied to the porphyrin derivatives of blood hemin, chlorophyll, and other plant and animal products. My invention also includes porphyrins obtained by synthesis or by degradation of the natural products.

Typical of the porphyrins which can be complexed with vanadium by the process of my invention are:

I—Blood hemin derivatives, their isomers and esters: protoporphyrin, mesoporphyrin, hematoporphyrin, deuteroporphyrin, etioporphyrin, and deuteroetioporphyrin;
II—Chlorophyll derivatives, their isomers and esters: desoxyphylloerythrin, pyrroporphyrin, γ-phylloporphyrin, desoxophylloerythroetioporphyrin, pyrroetioporphyrin, and γ-phylloetioporphyrin;
III—Other plant and animal products, their isomers and esters: uroporphyrin, coproporphyrin, and the like.

The porphyrins listed above are representative of the various classes of compounds which are effective as complexing agents with the vanadyl salts of my invention. Certain of these porphyrins can be synthesized directly while the remainder can be obtained or derived by degradation of the natural product. The resulting porphyrins can be further transformed to other porphyrins by decarboxylation esterification reduction and substitution, as is well known in the art.

In this connection it is considered that the preparation of the various porphyrins need not be discussed in detail since numerous such procedures have been disclosed in the literature. In the interest of clarity, however, it will be briefly mentioned that the basic porphyrin substance, i. e., porphine,

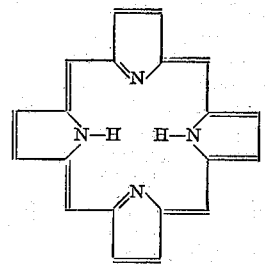

($C_{20}H_{14}N_4$) can be synthesized by the condensation of 2-formylpyrrole or by the reaction of pyrrole and formaldehyde.

Etioporphyrins ($C_{32}H_{38}N_4$) can be prepared by condensation reactions of dipyrrylmethenes with each other in the presence of formic acid or by a modified procedure using a maleic anhydride melt. Thus, etioporphyrin I can be prepared by condensation of two molecules of 3,4′-dimethyl-3′,4-diethyl-5-bromomethyl-5′-bromodipyrrylmethene hydrobromide and the corresponding perbromide at 190° C. for 30 minutes in a maleic anhydride melt. Etioporphyrin III can be prepared by condensation of 3,4′-dimethyl-3′,4-diethyl-5,5′-dibromomethyldipyrrylmethene hydrobromide and 3,3′-diethyl-4,4′-dimethyl-5, 5′-dibromodipyrrylmethene hydrobromide in maleic anhydride melt for one hour at 190° C.

Etioporphyrins are tetramethyl-tetraethyl porphyrins. They possess the structural basis of all porphyrins and are believed to be in the final stage of chemical degradation of the hemins. Thus, coproporphyrin ($C_{36}H_{38}N_4O_8$), protoporphyrin ($C_{34}H_{34}N_4O_4$) and mesoporphyrin $$(C_{34}H_{38}N_4O_4)$$

can all be transformed into etioporphyrin by decarboxylation.

Examples of porphyrins which can be artificially derived from hemoglobin and chlorophyll include hematoporphyrin ($C_{34}H_{38}N_4O_6$), mesoporphyrin ($C_{34}H_{38}N_4O_4$), phylloerythrin ($C_{33}H_{34}O_3N_4$) and the like. Hematoporphyrin can be obtained by the action of acetic acid and hydrogen bromide on hemin, while mesoporphyrin can be obtained by the reduction of hemin with hydrogen iodide. (See also Corwin et al, J. A. C. S. 68, 2473 (1946), for the preparation of mesoporphyrin IX.) Phylloerythrin, which is a derivative of chlorophyll (as are pyrro- and rhodoporphyrin), can be prepared from the latter by hydrolysis and decarboxylation to pyrropheophorbid followed by reduction. Numerous other methods for preparing the porphyrins of my invention are to be found in the literature.

Among the most important physical and chemical characteristics of the porphyrins are their color, fluoroescence, solubility, and the melting points of the crystalline esters. Porphyrin solutions have characteristic absorption spectra, and it is because of this that they have been identified and measured quantitatively by spectrophotometry in the prior art. The identification of the different isomers of the various porphyrins can generally be determined by the melting points of their crystalline methyl esters.

In my experiments in the preparation of porphyrin vanadium complexes I have found that the vanadyl salts have readily yielded substantially quantitative amounts of porphyrin vanadium complexes at low reaction temperatures and ordinary refluxing conditions. By the term "vanadyl" I mean the component VO++ and include vanadyl chlorides, bromides, iodides; vanadyl sulfates, nitrates; vanadyl acetates, formates, propionates and the like. These compound complex salts are representative of the various vanadyl salts that are effective in the process of my invention. The vanadyl salts enumerated above are available commercially or can be easily prepared by conventional methods. Thus, vanadyl sulfate can be obtained by reducing vanadium pentoxide in sulfuric acid with sulfur dioxide or oxalic acid. Methods for preparing other vanadyl salts can be readily found in the literature.

Suitable reaction medium solvents for carrying out the synthesis of the porphyrin vanadium complexes of my invention include formic, acetic, propionic acids and the like in admixture with an excess amount of a buffer such as the alkali formates, acetates, propionates, etc: acetic acid and its equivalents where the buffer is replaced by such as pyridine, lutidine, picoline, quinoline, analine, and the like. Pyridine and its equivalents have been found to increase the speed of reaction of the porphyrins with the vanadyl salts due to the greater solubility of the porphyrins in this solvent. It should be noted, however, that the solubility of the porphyrins in acetic acid is sufficient to permit substantial completion of the reaction.

In the actual preparation of porphyrin vanadium complexes by one embodiment of my invention I have reacted a porphyrin with a vanadyl salt in an acetic acid-sodium acetate medium to obtain substantially quantitative yields of a porphyrin vanadium complex.

In an alternate embodiment of my invention I have prepared porphyrin vanadium complexes in substantially quantitative yields by reacting a porphyrin with a vanadyl salt in an acetic acid-pyridine medium. In either of these embodiments of my invention the reaction proceeds under normal reflux conditions and at ordinary atmospheric pressures. In either of these embodiments of my invention I prefer to use vanadyl sulfate $V_2O_2(SO_4)_2 \cdot 13H_2O$ as the complexing agent.

In the preparation of porphyrin vanadium complexes using an acetic acid-sodium acetate reaction medium I have found that some of the porphyrins, notably etioporphyrin, possess limited solubility in acetic acid. Accordingly, the rate of porphyrin vanadium complex formation is controlled to a considerable extent by the rate of solution of the porphyrin. The solubility of the porphyrins in acetic acid is in general, however, sufficient to bring about complex formation with the vanadyl salt in open vessels at the boiling point of acetic acid. The reaction time for substantially complete conversion of the reactants in this reaction solvent varies from about 10 to 30 hours.

The proportions of the reactants can be varied if desired; however, I have found that best results can be obtained by reacting an excess of porphyrin, i. e., about 2 parts of porphyrin to about 3 parts of a vanadyl salt. Porphyrin vanadium complex formation proceeds to substantial completion in a solvent medium of about 190 parts of acetic acid to about 6 parts of sodium acetate. It is understood that the proportions of reactants and reaction medium components can be varied considerably by one skilled in the art. The particular proportions given above are therefore not intended as limitations, but rather as an example of one particular way of carrying out the preparation of the porphyrin vanadium complexes.

In the alternate embodiment of my invention for preparing porphyrin vanadium complexes, I have substituted pyridine for the sodium acetate buffer. Pyridine is an excellent solvent for porphyrins and their vanadium complexes. This solvent advantage, however, is counteracted, at least in part by the reduction of the concentration of free vanadyl ion due to what is thought to be the formation of vanadyl-pyridine complexes. Accordingly, I have found that the reaction of the porphyrin and vanadyl salt is improved considerably by using from about 25 to 50 percent pyridine in admixture with from 75 to 50 percent acetic acid. The time required for essentially completing the reaction with the above concentration of pyridine in acetic acid ranges from about 2 to 6 hours. Obviously other concentrations of pyridine can be used; however, the reaction time is prolonged and the attendant advantage of shorter reaction times is not realized.

As with the first embodiment of my invention, the proportions of reactants can be varied; however, about 3 parts of porphyrin to 2 parts of a vanadyl salt have given best results.

The crude porphyrin vanadium complex reaction product obtained by either of my procedures described above can be purified by dissolving the reaction mixture in a suitable organic solvent such as benzene. The mixture is then passed through a chromatographic column containing silica gel or other suitable adsorbent and the chromatogram developed and eluted with a mixture of benzene and n-propanol. The eluted material containing the porphyrin vanadium complex is evaporated to dryness, dissolved in a suitable hot solvent, cooled and crystallized. The crystallized material is then separated and dried. Obviously, other procedures for purifying the complex can be employed as will be understood by those skilled in the art.

The various advantages obtained by the process of my invention can be more easily understood by reference to the following specific examples:

*Example I*

In a round bottom flask fitted with a ground glass joint to a reflux condenser was placed 18.8 ml. of glacial acetic acid, 587 mg. of sodium acetate, 297 mg. of vanadyl sulfate $V_2O_2(SO_4)_2 \cdot 13H_2O$ and 200 mg. of crystalline etioporphyrin I. The mixture was refluxed by means of a Glas-col heating mantle for 24 hours or until a sample withdrawn with a pipette indicated spectrally that no more complex was being formed, i. e., 95% or better conversion. The mixture was cooled and diluted with approximately 15 ml. of water and let stand overnight for crystal growth.

The crystals were collected on a fritted glass filter and washed with water until the filtrate was colorless, i. e., the blue color of vanadyl salt had disappeared. The product was air dried to give a dark purple crystalline powder. The yield was essentially quantitative.

The complex was purified by dissolving it in benzene, using one ml. of benzene per milligram of complex. The solution was twice chromatographed over 60–200 mesh Davison silica gel using 1.8 ml. of silica gel per milligram of crude complex. The chromatograms were developed with 1:1 mixture of benzene and n-propanol. Continued washing eluted the complex, the unreacted porphyrin remaining on the column. The porphyrin was recovered by elution with a benzene-methanol mixture.

The benzene, n-propanol solution of the complex was evaporated to dryness in a stream of nitrogen. The residue was dissolved in hot benzene and crystallization induced by the addition of methanol. The product consisted of glistening purple platelets. Yield 75% of theoretical.

*Example II*

Using the same proportions of reactants the preparation of crude etioporphyrin III was carried out according to the method for Example I.

The crude material was purified by mixing with 10 ml. of glacial formic acid, heating at 65°–75° C. for one hour, adding a little Celite and filtering through a bed of Celite. The filter cake was washed with 2 ml. of formic acid, dispersed in 15 ml. of acid and heated to boiling for five minutes. The mixture was cooled at 0° C. for fifteen minutes and filtered. The cake was then further washed with water and dried.

The porphyrin complex was extracted from the Celite with 60 ml. of hot benzene and the extract chromatographed over a column of silica gel. The complex formed a brilliant purple band which was eluted with a 1:1 mixture of benzene and n-propanol. The eluate was filtered and concentrated to 50 ml. Enough benzene was then added to the hot mixture to effect complete solution and then cooled.

Sparkling purple platelets were filtered off and washed with n-propanol. Yield 68% of theoretical.

*Example III*

To a round bottom flask fitted with a ground glass joint to a reflux condenser was added 13.5 ml. of glacial acetic acid, 6.5 ml. of pyridine, 297 mg. of vanadyl sulfate and 200 mg. of etioporphyrin I. The mixture was refluxed until the reaction was essentially complete, i. e., about 2 to 3 hours. The cooled reaction mixture was diluted with water and worked up as in Example I. The yield of crude porphyrin vanadium complex was essentially quantitative.

*Example IV*

In the same apparatus as described for the above examples there was placed 79 ml. of glacial acetic acid, 2.45 g. of sodium acetate, 1.23 g. of vanadyl sulfate, and 1.0 g. of mesoporphyrin IX. This mixture was then worked up as in Example I. The yield was essentially quantitative.

The dimethyl ester of the mesoporphyrin IX vanadium complex was prepared by refluxing with one liter of a methanolic solution of dry hydrogen chloride. The reaction product was purified by repeated extraction with a total of 11 ml. of glacial formic acid followed by repeated extraction with a total of 25 ml. of 50% aqueous formic acid. The residue was dissolved in benzene and chromatographed over a calcium carbonate column. Development of the chromatogram and elution was accomplished with benzene, the eluted material was filtered, concentrated to 20 ml., and hot methanol added to induce precipitation. The complex was crystallized by cooling and washed with cold methanol. Yield 36.5% of theoretical.

*Example V*

About 799 mg. of protoporphyrin IX was esterified to the dimethyl ester compound by refluxing the porphyrin with 400 ml. of a methanolic solution of dry hydrogen chloride for fifteen minutes.

The porphyrin vanadium complex was then prepared as follows: To a round bottom flask there was added 32 ml. of glacial acetic acid, 980 mg. of sodium acetate, 496 mg. of vanadyl sulfate, and 400 mg. of protoporphyrin IX dimethyl ester. It should be noted that the quantity of acetic acid and sodium acetate was increased by 60 percent for this preparation. The reaction mixture was worked up as in Example I and the crude complex reaction product washed with 65 percent formic acid at room temperature until the washings were no longer colored. The residue was then washed with water and dried. The crude complex was extracted with benzene and chromatographed over a calcium carbonate column according to the procedure used for Example IV. Yield 20% of theoretical.

From the above detailed examples it can be seen that the process of my invention can be readily adapted to the preparation of porphyrin vanadium complexes in substantial yields without the attendant restrictions of prior art procedures.

I have determined the structure of the porphyrin vanadium complexes on the basis of ultimate analysis for carbon, hydrogen, nitrogen, oxygen, and vanadium, on infra red spectra, and on X-ray study of the unit cell.

I have found that the porphyrin vanadium complexes have a structure which can be pictured thus:

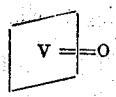

where the porphyrin ring, situated perpendicular to the plane of the paper is represented by a parallelogram. Thus for the vanadium complex of etioporphyrin I the following results were obtained:

|  | C | H | N | O | V |
|---|---|---|---|---|---|
| Theoretical | 70.70 | 6.68 | 10.31 | 2.94 | 8.38 |
| Found (average of 2 determinations) | 70.9 | 6.8 | 10.8 | 3.3 | 9.4 |

Because of the nature of the structure of the porphyrin vanadium complexes they have been found to be extremely stable compounds. They are very surface active agents and can obviously be used as such in appropriate compositions. The porphyrin vanadium complexes can also be used as pigments and as dyes and dye intermediates. In addition, some of these compounds, notably the deuteroporphyrin-vanadium complexes, can be further modified by substitution and coupling, e. g., with diazonium compounds for use as dyes and the like.

Specific advantages realized by the process of my invention for the preparation of porphyrin vanadium complexes are: (1) a stable vanadyl salt replaces the undesirable liquid vanadium tetrachloride, thereby eliminating any special procedure for handling that reactant; (2) an uncontaminated final product in substantial yields can be obtained; (3) the reaction can be carried out at the normal refluxing conditions of the reaction medium, thereby eliminating the need for pressure equipment; (4) the relatively low reaction temperatures (compared to the prior art) makes possible the preparation of complexes of porphyrins which would otherwise be destroyed or altered; and (5) the process can be easily adapted to large scale preparation of the porphyrin vanadium complexes in improved yields.

Resort may be had to such modifications and variations as fall within the spirit of the invention and scope of the appended claims.

I claim:

1. In a process for synthesizing a porphyrin vanadium complex by reacting a porphyrin with a compound of vanadium the improvement which comprises reacting a porphyrin with a vanadyl salt in a mutual solvent for the porphyrin and the vanadyl salt, the said vanadyl salt being one in which vanadium is present in the quadrivalent state.

2. In a process for synthesizing a porphyrin vanadium complex by reacting a porphyrin with a compound of vanadium the improvement which comprises reacting a porphyrin with vanadyl sulfate in a mutual solvent for the porphyrin and the vanadyl sulfate.

3. In a process for synthesizing a porphyrin vanadium complex by reacting a porphyrin with a compound of vanadium the improvement which comprises reacting a porphyrin with a vanadyl salt in an acetic acid-sodium acetate reaction medium, the said vanadyl salt being one in which vanadium is present in the quadrivalent state.

4. A process according to claim 3 in which the porphyrin is etioporphyrin.

5. A process according to claim 3 in which the porphyrin is mesoporphyrin.

6. A process according to claim 3 in which the porphyrin is protoporphyrin.

7. A process according to claim 3 in which the vanadyl salt is vanadyl sulfate.

8. In a process for synthesizing a porphyrin vanadium complex by reacting a porphyrin with a compound of vanadium the improvement which comprises reacting a porphyrin with a vanadyl salt in an acetic acid-pyridine reaction medium, the said vanadyl salt being one in which vanadium is present in the quadrivalent state.

9. A process according to claim 8 in which the porphyrin is etioporphyrin.

10. A process according to claim 8 in which the porphyrin is mesoporphyrin.

11. A process according to claim 8 in which the porphyrin is protoporphyrin.

12. A process according to claim 8 in which the vanadyl salt is vanadyl sulfate.

13. A process according to claim 8 wherein the reaction medium comprises from 25 to 50 percent pyridine and from 75 to 50 percent acetic acid.

14. In a process for synthesizing a porphyrin vanadium complex by reacting a porphyrin with a compound of vanadium the improvement which comprises refluxing a porphyrin with a vanadyl salt in an acetic acid-sodium acetate reaction medium and thereafter purifying the reaction product over an adsorbent column, the said vanadyl salt being one in which vanadium is present in the quadrivalent state.

15. In a process for synthesizing a porphyrin vanadium complex by reacting a porphyrin with a compound of vanadium the improvement which comprises refluxing a porphyrin with vanadyl sulfate in an acetic acid-sodium acetate reaction medium, dissolving the reaction mixture, adding it to an adsorbent column and thereafter eluting and recovering a purified porphyrin vanadium complex.

16. In a process for synthesizing a porphyrin vanadium complex by reacting a porphyrin with a compound of vanadium the improvement which comprises refluxing a porphyrin with vanadyl sulfate in an acetic acid-pyridine reaction medium, dissolving the reaction mixture, adding it to an adsorbent column and thereafter eluting and recovering a purified porphyrin vanadium complex.

References Cited in the file of this patent

UNITED STATES PATENTS 2,740,794    Bonner _____ Apr. 3, 1956

OTHER REFERENCES

"Modern Inorganic Chemistry," Mellor, Longmans, Green and Co., New York, p. 760 (1946).

"Inorganic Chemistry," Ephramm, 4th Eng. Ed., Nordeman Pub. Co., New York, pp. 494–5 (1943).

UNITED STATES PATENT OFFICE
Certificate of Correction

Patent No. 2,867,626

January 6, 1959

John Gordon Erdman

It is hereby certified that error appears in the printed specification of the above numbered patent requiring correction and that the said Letters Patent should read as corrected below.

Column 6, in the table, under the heading "V" for "8.38" read —9.38—.

Signed and sealed this 28th day of April 1959.

[SEAL]

Attest:
T. B. MORROW,
*Attesting Officer.*

ROBERT C. WATSON,
*Commissioner of Patents.*